United States Patent [19]

Kreiner et al.

[11] 4,426,581
[45] Jan. 17, 1984

[54] ARRANGEMENT FOR MEASURING RADIOACTIVITY CONCENTRATIONS

[75] Inventors: Hans-Jürg Kreiner; Rudolf Seif, both of Munich; Wilhelm Zimmer, Gaimersheim, all of Fed. Rep. of Germany

[73] Assignees: Munchener Apparatebau Für Elektronische Geräte Kimmel GmbH & Co. KG, Hohenbrunn; Gesellschaft Fur Strahlen-und Umweltforschung mbH, Neuherberg, both of Fed. Rep. of Germany

[21] Appl. No.: 167,064
[22] PCT Filed: Jan. 26, 1979
[86] PCT No.: PCT/DE79/00010
  § 371 Date: Sep. 26, 1979
  § 102(e) Date: Sep. 19, 1979
[87] PCT Pub. No.: WO79/00552
  PCT Pub. Date: Aug. 23, 1979

[30] Foreign Application Priority Data

Jan. 26, 1978 [DE] Fed. Rep. of Germany ....... 2803440

[51] Int. Cl.$^3$ .............................................. G01T 1/18
[52] U.S. Cl. .................................................. 250/380
[58] Field of Search ................... 250/303, 364, 363 R, 250/380, 253, 255

[56] References Cited

U.S. PATENT DOCUMENTS 3,531,639 9/1970 Baum et al. ......................... 250/364
4,092,541 5/1978 Neidl ................................... 250/380

OTHER PUBLICATIONS

Levins et al., "β-Scintillation Monitor for Krypton-85 at High Pressures", Nuc. Ins. & Methods 146, No. 3, (1977), pp. 517-525.

Primary Examiner—Alfred E. Smith
Assistant Examiner—Janice A. Howell
Attorney, Agent, or Firm—Toren, McGeady and Stanger

[57] ABSTRACT

A measuring head 1 which contains in a shielding housing 3 a measuring chamber 5 with a surface barrier-layer detector 9 is provided for measuring the noble gas activity concentration and the aerosol activity concentration. The gas whose activity concentration is to be measured is compressed and introduced into the measuring chamber 5. Due to the pressure increase of the gas, the volume of the measuring chamber 5 and, therefore, the weight of the shielding housing 3 can be reduced.

8 Claims, 4 Drawing Figures

ARRANGEMENT FOR MEASURING RADIOACTIVITY CONCENTRATIONS

The invention relates to an arrangement for measuring the radioactivity concentrations of a gas, with a measuring chamber for receiving the gas and a beta-ray measuring device which measures the activity concentrations and whose detector is arranged in the measuring chamber.

Arrangements of this type are usually used for measuring the activity concentrations of isotopes of noble gases. Since the detection sensitivity deteriorates when the basic load of the detector increases due to external radiation, the measuring chamber is set up at locations with low external radiation, for example, in special spaces next to the exhaust stack of a nuclear power plant.

It would be conceivable to shield the measuring chamber by a housing of shielding material to such an extent that the measuring chamber could be set up at locations with high basic load. However, such an arrangement could only be operated as a stationary system because the weight would not allow moveable, i.e. portable embodiments.

It is the object of the invention to specify an arrangement for measuring the radioactivity concentration of a gas which has a high detection sensitivity even in the case of a high basic load due to external radiation, but whose weight is so low that the arrangement can be used as a moveable system.

In an arrangement of the above-explained type, this object is met by arranging the measuring chamber in a pressure-type housing of shielding material, particularly lead, and by connecting the measuring chamber to a compressor which increases the gas pressure in the measuring chamber. In this manner, the volume of the measuring chamber can be reduced by such an extent that the weight of the shielding housing required for a high basic load remains low.

To compensate for the external radiation, the measuring device is preferably provided with a second detector which is shielded from the measuring chamber. By means of the second detector, the share of the external radiation in the measuring result of the first detector can be eliminated. Those embodiments have been found advantageous in which the first and second detectors are arranged on opposite locations of the first measuring chamber.

In a preferred embodiment, the compressor is connected to an aerosol filter arranged in a second measuring chamber. For measuring the aerosol activity concentration, a third detector of the measuring device is arranged in the second measuring chamber. This embodiment facilitates the assessment of the incorporation dose. The incorporation dose is caused by the intake of radioactive gases and aerosols through the respiratory tract.

The total weight of the arrangement stays within the limits to be required of a portable measuring device when the two measuring chambers are arranged in a common housing and are merely separated from each other by a shielding dividing wall. The volume of the second measuring chamber is generally much smaller than the volume of the first measuring chamber, so that the outer housing walls of the second measuring chamber in connection with the shielding dividing wall ensure the shielding of the first measuring chamber.

The second detector is advantageously also utilized for the compensation of the basic load of the third detector. The second detector is preferably arranged in the region of the shielding dividing wall between the first and the third detectors.

Especially high detection sensitivities can be obtained with the use of a detector which compensates for the external radiation (second detector) when the outer shape of the housing and the wall thickness of the housing walls and the shielding dividing wall are chosen in such a way that the thickness of the shielding material is about the same for the three detectors independently from the direction of incidence of the external radiation. Last but not least, the background compensation is improved by the fact that all the detectors are of the same type.

In order to keep the volume of the first measuring chamber as small as possible and, thus, the weight of the shielding housing as low as possible, the internal diameter of the first measuring chamber is dependent upon the distance from the location of the detector, preferably in accordance with the geometric detection sensitivity which is the best for this distance. The shape of a spherical segment is advantageous, the detector being arranged in its apex. However, useful and, above all, more easily to produce are those embodiments in which the spherical segment is replaced by one or possibly a plurality of axially adjacent truncated cones. The detector is arranged at the top.

The detector of the first measuring chamber must also be pressure-resistant because an increased gas pressure is admitted into the measuring chamber. Surface barrier-layer detectors have been found useful. Detectors of this type can be arranged directly in the pressure chamber. Also suitable are detectors having a scintillator layer arranged in the measuring chamber, the scintillator layer being connected to a photomultiplier through a pressure-resistant photoconductor which is sealed in a pressure-tight manner from the housing.

To facilitate the replacement of the aerosol filter, it may be provided that the third detector is arranged in a shaft of the housing into which there is inserted an insert body which supports the aerosol filter, that the aerosol filter is constructed as a filter plate and is fastened to the insert body by means of a screw cap above a recess of the insert body which faces toward the second detector, that a through-opening is provided in the bottom of the screw cap, that a first duct extending through the insert body is connected through grooves in the insert body and/or the screw cap to that side of the filter plate which faces toward the third detector and that a second duct extending through the insert body leads into the recess of the insert body. The insert body can be taken out of the housing without having to detach the supply lines which are connected to the ducts. The filter plate is freely accessible when the insert body is taken out.

The entire arrangement for measuring gas activities and aerosol activities can be operated by means of the compressor as the single feed pump if the aerosol filter is arranged between the first and second measuring chambers and the compressor is arranged between the aerosol filter and the first measuring chamber.

To prevent the formation of condensation water in the first measuring chamber, the compressed gas is cooled preferably before being fed into the first measuring chamber, so that the water vapor contained in the gas can be condensed and removed already before being fed in. Cooling is advantageously effected by means of a tubular cooler arranged between the compressor and the first measuring chamber, the cooler being ventilated by means of a ventilator which also ventilates the compressor. Accordingly, the function of the ventilator can be utilized repeatedly. The cooling effect can be improved by arranging an expansion cooler with a heat exchange chamber between the compressor and the first measuring chamber, the compressed gas flowing in a pipe line through this heat exchange chamber and an expansion nozzle for the gas supplied from the first measuring chamber opening out in this heat exchange chamber. Moreover, the heat exchange chamber can be arranged at the tubes of the tubular cooler and serve as a cooling body for the tubes.

A marked increase of the detection probability or a marked reduction of the weight of the arrangement can already be achieved when the compressor increases the pressure of the gas to more than 2 bars, particularly to 2 to 10 bars. Pressures of 4 to 6 bars are preferred.

In the following, embodiments of the invention shall be explained in more detail with the aid of the drawing.

Figure 1:
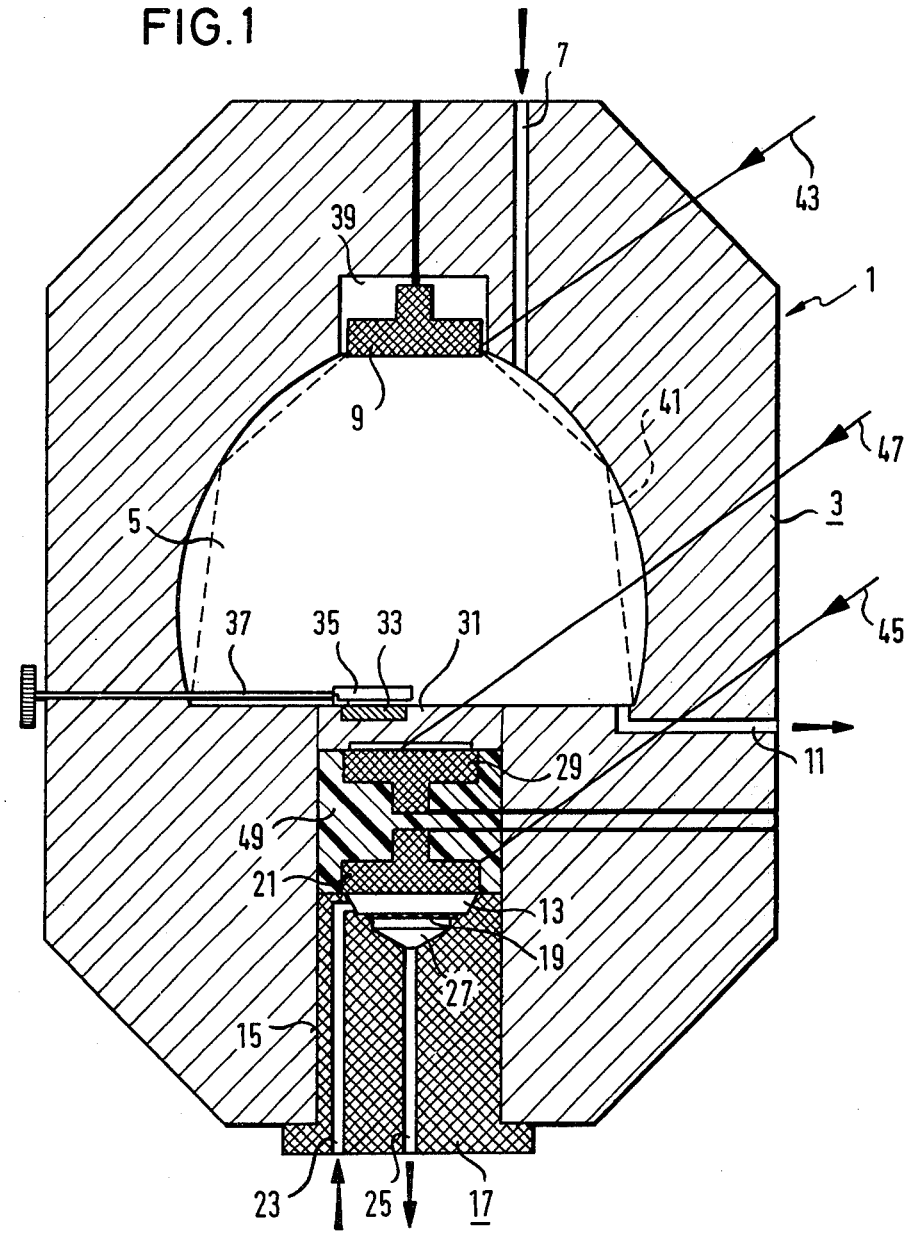
FIG. 1 shows a schematic illustration of a measuring head for the joint measurement of noble gas activities and aerosol activities.

FIG. 1 shows a section through a measuring head 1 of a measuring device which is suitable for measuring the noble gas activity concentration as well as the aerosol activity concentration. In a shielding housing 3 consisting of lead or tungsten, the measuring head 1 contains a measuring chamber 5 into which compressed gas can be introduced through a duct 7; the activity concentration of this gas is to be measured by means of a surface barrier-layer detector 9 for beta-rays. The duct 7 opens out into the measuring chamber 5 in the region of the surface barrier-layer detector 9. The gas introduced into the measuring chamber 5 flows off through a duct 11 on that side of the measuring chamber 5 which faces away from the surface barrier-layer detector 9. The duct 11 is arranged and designed in such a manner that the condensation water forming due to the pressure increase of the gas in the measuring chamber 5 can also be removed.

Within the same housing 3 there is provided a second measuring chamber 13 which is formed between an insert body 17 which inserted into a shaft 15 of the housing, an aerosol filter 19 and another surface barrier-layer detector 21. Into the measuring chamber 13 there opens out a duct 23 through which the aerosol-containing gas can be introduced into the measuring chamber 13. On that side of the aerosol filter 19 which faces away from the surface barrier-layer detector 21, the insert body 17 has a recess 27 which is connected to a duct 25 and exposes the filter surface of the aerosol filter 19. The surface barrier-layer detector 21 is as closely as possible arranged above the aerosol filter 19 and measures the activity of the aerosol extracted from the aerosol filter 19.

Between the measuring chamber 5 and the measuring chamber 13 there is arranged a surface barrier-layer detector 29 which is separated from the measuring chamber 5 by means of a shielding dividing wall 31. In FIG. 1, the shielding dividing wall 31 is illustrated having the width of the shaft 15; however, it can also extend in the form of a dividing wall over the entire width of the housing 3 between two housing halves each which contain the measuring chambers. The surface barrier-layer detector 29 can be connected to the surface barrier-layer detector 9 or the surface barrier-layer detector 21 in a conventional compensating circuit. The compensating circuit subtracts from the measuring results of the surface barrier-layer detectors 9, 21 that portion of the detector 29 which is caused by the external radiation. For the calibration of the surface barrier-layer detector 9 there is embedded in the shielding dividing wall 31 a Sr-90-test preparation 33 which can be optionally exposed or shielded by means of a shielding slide 35. The shielding slide 35 can be moved by means of an outwardly projecting drive rod 37.

The measuring chamber 5 has the shape of a spherical segment at whose apex there is arranged the surface barrier-layer detector 9 in a recess 39. The active surface of the surface barrier-layer detector 9 faces toward the measuring chamber 5. The shape of the measuring chamber 5 is chosen in such a manner that the geometric detection sensitivity of the surface barrier-layer detector 9 arranged in the zenith of the spherical segment is at an optimum independently from the distance of the space point measured normally relative to the equator of the spherical segment. For reasons of a simpler production, the spherical segment of the measuring chamber 5 can also be approximated by truncated cones which taper toward the surface barrier-layer detector 9 and are placed one on top of the other, as indicated in FIG. 1 by broken lines 41.

The thickness of the housing 3 including the thickness of the shielding dividing wall 31 is chosen or these walls are shaped in such a manner that the external radiation 43 and 45 impinging upon the surface barrier-layer detectors 9 and 21 always penetrate through almost the same thickness of shielding material as the external radiation 47 impinging upon the surface barrier-layer detector 29. To adhere to this rule, the material thickness of the housing 3 is reduced at the four corners and the material 49 between the two surface barrier-layer detectors 21 and 29 consists of plastic material through which the beta-radiation can penetrate. The measuring head 1 according to FIG. 1 has the advantage that, due to the pressure increase of the gas fed into the pressure-tight measuring chamber 5, the volume of the measuring chamber 5 and, therefore, the weight of the lead or tungsten housing required for shielding the measuring chamber 5 is reduced. The special design of the measuring chamber 5 results in an increase of the geometric detection probability. In an executed device, the detection limits were at 1r/h ($^{136}$Cs) of $2 \times 10^{-7}$ Ci/cm$^3$ ($^{41}$Ar) or $8 \times 10^{-10}$ Ci/cm$^3$ (natural aerosols). Accordingly, the measuring device is especially suitable for measuring the activity concentrations in the case of increased background radiation and can also be used in cases of trouble, such as leaks. The measuring range of this device spanned seven orders of magnitude. Since the noble gas activity concentration as well as the aerosol activity concentration can be measured with one and the same device, the incorporation dose can be determined by means of this device.

Figure 2:
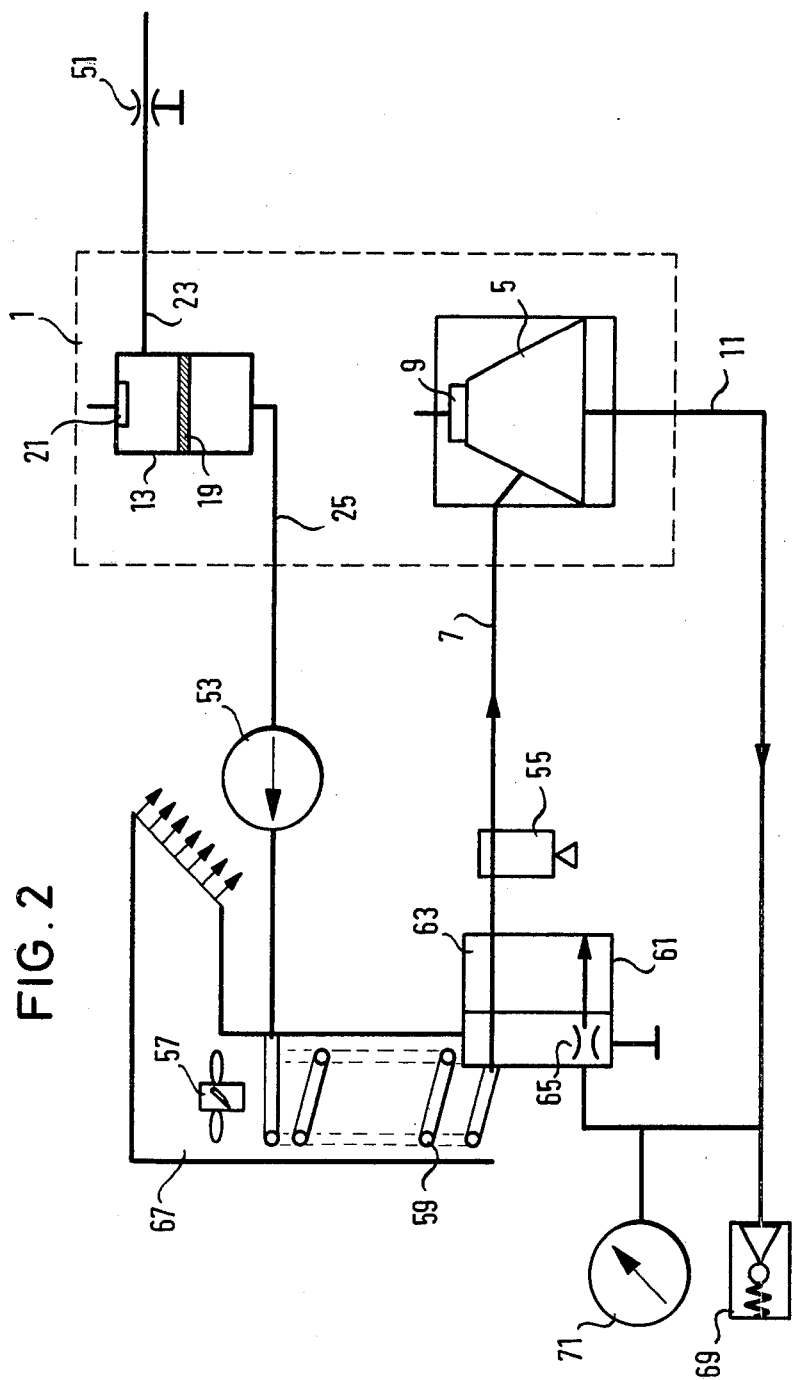
FIG. 2 shows a schematic illustration of the entire measuring arrangement for the measuring head according to FIG. 1.

FIG. 2 schematically shows an operation diagram for the measuring head illustrated in FIG. 1. The gas whose noble gas activity concentration and aerosol activity concentration is to be measured is initially fed through a throttle 51 and the duct 23 into the measuring chamber 13 in which the surface barrier-layer detector 21 is arranged. The measuring chamber 13 is connected to the aerosol filter 19 which is connected to a compressor 53 through the duct 25. The compressor 53 takes in the gas through the measuring chamber 13 and the aerosol filter 19, the throttle 51 compensating the pulsations of the compressor which, for example, is constructed as a diaphragm pump.

The compressor increases the pressure of the aerosol-free gas to values of between about 2 to 10 bars, preferably 4 to 6 bars, and presses the compressed gas through the duct 7 into the measuring chamber 5 containing the surface barrier-layer detector 9. To prevent the water vapor of the compressed gas from condensing in the measuring chamber 5, the compressed gas is initially cooled and consequently conveyed through a dehydrating device or condenser 55. Cooling takes place in two stages. The compressed gas is initially conveyed through a tube coil 59 which is ventilated by a ventilator 57, the tube coil 59 being followed by an expansion cooler 61. The expansion cooler 61 has a heat exchange chamber 63 through which the compressed gas is conveyed in a tube which is not illustrated in detail. An expansion nozzle 65 which is connected to the duct 11 of the measuring head 1 opens out into the heat exchange chamber 63, the expansion nozzle 65 expanding the gas which is discharged from the measuring chamber 5. The expansion cooler 61, moreover, serves as the cooling body for the tube coil 59. The tube coil 59 and the ventilator 57 are arranged in a ventilation shaft 67 through which the ventilator 57 ventilates the compressor 53. To the duct 11 there are additionally connected a safety valve 69 and a pressure gauge 71, for example, a manometer.

Figure 3:
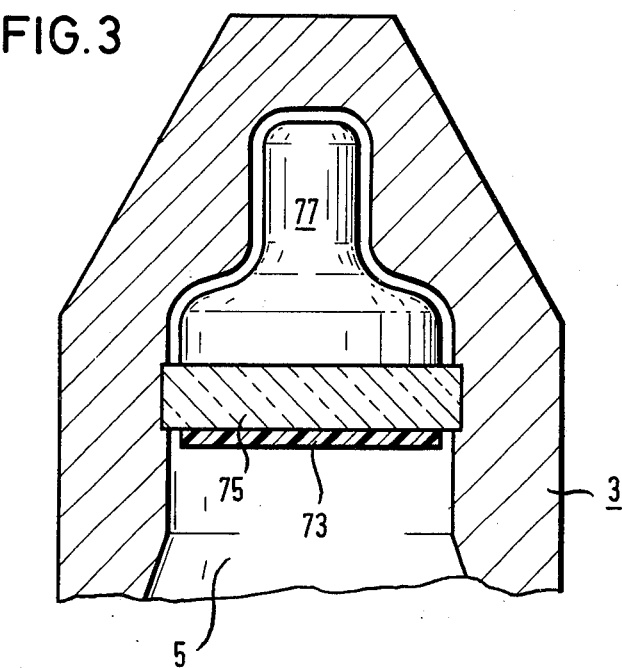
FIG. 3 shows a schematic illustration of another embodiment of a detector to be used in the measuring head according to FIG. 1.

FIG. 3 shows another embodiment of a pressure-tight beta-ray detector. This detector comprises a plastic scintillator 73 which is arranged in the measuring chamber 5 and is connected, through a pressure-tight photoconductor 75 which is sealed from the shielding housing 3, to a photomultiplier 77 which is arranged within the housing, but without being subjected to pressure.

Figure 4:
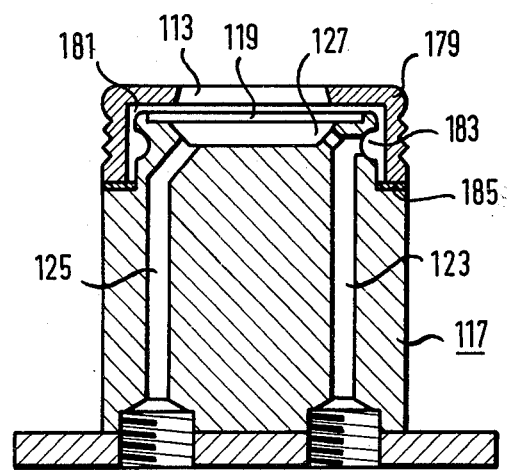
FIG. 4 shows an embodiment of an aerosol filter to be used in the measuring head according to FIG. 1.

FIG. 4 shows a preferred embodiment of an exchangeable aerosol filter insert for the measuring head according to FIG. 1. Components having the same function are denoted by reference numerals which are increased by the number 100, so that the description of FIG. 1 can be referred to for the explanation of the manner of operation. The aerosol filter insert has an insert body 117 which consists of lead and has to be inserted into the shaft of the measuring head. On its surface facing toward the detector, the insert body 117 has a recess 127 in which there opens out a duct 125 which extends to the opposite side of the insert body 117. The recess 127 is covered by a filter plate 119 which is held above the recess 127 by means of a screw cap 179. In the region of the filter plate 119, the screw cap has a through-opening 113 which forms the measuring chamber. At the inner side of the screw cap 179 there are provided radial grooves 181 which open out within the through-opening 113 and extend at the inner surface of the screw cap 179 axially beyond a circumferential groove 183 which is arranged on the insert body 117 in the interior of the screw cap 179. The circumferential groove 183 is connected to a duct 123 which also extends to that side of the insert body 117 which is located opposite the detector. The screw cap 179 is sealed by means of a gasket 185 on a shoulder of the insert body 117 which faces toward the detector. As a result, the insert body 117 can be taken out of the shaft without having to detach the supply lines to the ducts 123, 125 and the filter plate 119 can be exchanged by unscrewing the screw cap 179.

We claim:

1. Device for measuring the radioactivity concentration of a gas, comprising a pressure-tight shielding housing forming a first measuring chamber, a compressor in communication with said first measuring member for introducing the gas into said first measuring chamber under high pressure, and a beta-ray detector located in said first measuring chamber, wherein the improvement comprises a shielding dividing wall located within said shielding housing and in combination with said shielding housing forming a second measuring chamber separated from said first measuring chamber by said shielding dividing wall, an aerosol filter located within said second measuring chamber and in communication with said compressor, a second detector located within said shielding housing and shielded from said first measuring chamber, said second detector is located at a position opposite said first detector and on the opposite side of said first measuring chamber from said first detector, said second detector arranged for compensating for external radiation, a third detector located in said second measuring chamber for measuring the aerosol activity concentration present in the gas, said first, second and third detectors are formed as surface barrier layer detectors, and the exterior shape of said shielding housing in combination with the thickness of said shielding housing walls and of said shielding dividing wall are selected so that the effective thickness of the shielding material shielding said first, second and third detectors from external radiation is about equal for each of said detectors independently of the direction of incidence of said external radiation.

2. Device, as set forth in claim 1, wherein said first measuring chamber is in the shape of a spherical segment.

3. Device, as set forth in claim 1, wherein said first measuring chamber has the shape of at least one truncated cone with said first detector positioned toward the smaller diameter end of said cone.

4. Device, as set forth in claim 1, wherein said first measuring chamber has the shape of a plurality of truncated cones arranged in axial alignment and with said first detector located at the end of said truncated cones having the smallest diameter.

5. Device, as set forth in claim 1, wherein said second detector is located in the region of said shielding dividing wall and spaced from said first measuring chamber and located between said first and said third detectors.

6. Device, as set forth in claim 1, wherein said shielding housing forms a shaft extending inwardly from the exterior surface thereof, an insert body positioned within said shaft, aerosol filter located within said insert body, said aerosol filter is formed as a filter plate, said insert body having a recess at the inner end thereof facing toward said third detector, said aerosol filter comprises a filter plate located in said recess in said insert body, and a screw cap secured to the end of said insert body containing said recess and said screw cap retains said filter plate in place, said screw cap has a through-opening therein opposite said filter plate, grooves extending around said insert body in the region of said screw cap, a first duct extending through said insert body and connected to said grooves adjacent said filter plate, said grooves being in communication with the side of said filter plate facing toward said third detector, and a second duct extending through said insert body and opening into said recess in said body.

7. Device, as set forth in claim 1, including a cooler arranged in the path of the gas flow between said compressor and said first measuring chamber, said cooler is a tubular cooler, a ventilator arranged to ventilate said tubular cooler and said compressor.

8. Device, as set forth in claim 1, including a cooler positioned in the path of the gas flow between said compressor and said first measuring chamber, said cooler is an expansion cooler and includes a heat exchange chamber, a pipeline extending through said heat exchange chamber and arranged to flow the compressed gas therethrough and an expansion nozzle opening into said heat exchange chamber for flowing the gas thereto from said first measuring chamber.

* * * * *